United States Patent
Lee et al.

(10) Patent No.: US 11,937,157 B2
(45) Date of Patent: Mar. 19, 2024

(54) V2X OPERATION METHOD IMPLEMENTED BY TERMINAL IN WIRELESS COMMUNICATION SYSTEM AND TERMINAL USING SAME

(71) Applicant: LG ELECTRONICS INC., Seoul (KR)

(72) Inventors: Seungmin Lee, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/856,522

(22) Filed: Jul. 1, 2022

(65) Prior Publication Data

US 2022/0337981 A1   Oct. 20, 2022

Related U.S. Application Data

(63) Continuation of application No. 16/082,203, filed as application No. PCT/KR2017/002410 on Mar. 6, 2017, now Pat. No. 11,395,114.

(60) Provisional application No. 62/303,387, filed on Mar. 4, 2016.

(51) Int. Cl.
*H04W 4/40* (2018.01)
*H04W 28/26* (2009.01)
*H04W 72/1263* (2023.01)
*H04W 76/30* (2018.01)

(52) U.S. Cl.
CPC .............. *H04W 4/40* (2018.02); *H04W 28/26* (2013.01); *H04W 72/1263* (2013.01); *H04W 76/30* (2018.02)

(58) Field of Classification Search
CPC ........... H04W 4/40; H04W 4/46; H04W 4/48; H04W 4/70; H04W 28/26; H04W 72/1263; H04W 72/20; H04W 76/30; H04W 76/14
See application file for complete search history.

(56) References Cited

U.S. PATENT DOCUMENTS

| | | |
|---|---|---|
| 2014/0094183 A1 | 4/2014 | Gao et al. |
| 2015/0282184 A1 | 10/2015 | Yang et al. |
| 2017/0127471 A1 | 5/2017 | Yu et al. |
| 2018/0310297 A1 | 10/2018 | Martin et al. |
| 2018/0317221 A1 | 11/2018 | Yasukawa et al. |
| 2018/0352412 A1 | 12/2018 | Huang et al. |

FOREIGN PATENT DOCUMENTS

| | | |
|---|---|---|
| WO | WO 2015152785 | 10/2015 |
| WO | WO 2015170866 | 11/2015 |

OTHER PUBLICATIONS

International Search Report in International Application No. PCT/KR2017/002410, dated May 26, 2017, 4 pages.

(Continued)

*Primary Examiner* — Ricardo H Castaneyra
(74) *Attorney, Agent, or Firm* — Fish & Richardson P.C.

(57) ABSTRACT

The present invention provides a V2X operation method implemented by a V2X (vehicle-to-X) terminal in a wireless communication system, the method characterized by: determining whether or not V2X message transmission is possible on reserved periodic resources; and, if the V2X message transmission is not possible on the reserved periodic resources, transmitting to another V2X terminal a first scheduling assignment (SA) channel comprising information which indicates that the V2X message transmission is not possible on the reserved periodic resources.

6 Claims, 11 Drawing Sheets

(56) References Cited

OTHER PUBLICATIONS

LG Electronics, "Discussion on Scheduling Assignment for PC5-based V2V," 3GPP TSG RAN WG1 #84, dated Feb. 15-19, 2016, 6 pages.

LG Electronics, "Discussion on UE Autonomous Resource Allocation Mechanism for PC5-based V2V," 3GPP TSG RAN WG1 Meeting #84, dated Feb. 15-19, 2016, 7 pages.

Samsung, "Scheduling Assignment Options for V2V Communication," 3GPP TSG RAN WG1 #84, dated Feb. 15-19, 2016, 7 pages.

V2X OPERATION METHOD IMPLEMENTED BY TERMINAL IN WIRELESS COMMUNICATION SYSTEM AND TERMINAL USING SAME

CROSS-REFERENCE TO RELATED APPLICATIONS

This application is a continuation of U.S. application Ser. No. 16/082,203, filed on Sep. 4, 2018, which is a National Stage application under 35 U.S.C. § 371 of International Application No. PCT/KR2017/002410, filed on Mar. 6, 2017, which claims the benefit of U.S. Provisional Application No. 62/303,387, filed on Mar. 4, 2016. The disclosures of the prior applications are incorporated by reference in their entirety.

BACKGROUND OF THE INVENTION

Field of the Invention

The present invention relates to wireless communication and, more particularly, to a V2X operation method performed by a terminal in a wireless communication system and a terminal using the method.

Related Art

In the International Telecommunication Union Radio communication sector (ITU-R), the standardization task of International Mobile Telecommunication (IMT)-Advanced, that is, a next-generation mobile communication system after the 3$^{rd}$ generation, is in progress. IMT-Advanced has an object of supporting multimedia services based on the Internet protocol (IP) at a transfer rate of 1 Gbps in the still and low-speed moving state and 100 Mbps in the high-speed moving state.

3$^{rd}$ Generation Partnership Project (3GPP) is a system standard that satisfies the requirements of IMT-Advanced and prepares LTE-advanced (LTE-A) improved from long term evolution (LTE) based on the orthogonal frequency division multiple access (OFDMA)/single carrier-frequency division multiple access (SC-FDMA) transmission method. LTE-A is one of strong candidates for WIT-Advanced.

There is recently a growing interest in the device-to-device (D2D) technology for direct communication between devices. Specifically, D2D has been in the spotlight as a communication technology for a public safety network. A commercial communication network rapidly changes into LTE, but the current public safety network is chiefly based on the 2G technology due to the problem of a collision against the existing communication standard and in terms of costs. Such a technology gap and needs for improved services lead to efforts to improve the public safety network.

The public safety network has high service requirements (reliability and security) compared to the commercial communication network and requires direct signal transmission/reception, that is, a D2D operation, between devices, particularly, although coverage of cellular communication is not affected or not available.

For example, in general, a D2D operation may have various advantages in that it is signal transmission/reception between close devices. For example, a D2D terminal may perform data communication at a high transfer rate and with low latency. Furthermore, the D2D operation can distribute traffic concentrated on an eNB. If a terminal performing a D2D operation plays the role of a relay, the D2D operation may also function to extend coverage of an eNB. Communication related to a vehicle, including signal transmission/reception between vehicles as the extension of the aforementioned D2D communication, is specially called VEHICLE-TO-X (V2X) communication.

In V2X communication, a V2X UE transmits a V2X message by taking into consideration a message reserved by another V2X UE. In this case, a resource reserved to transmit the V2X message is assumed to be maintained for a preset time, but the resource reserved to transmit the V2X message may be released before the preset time elapses (because a reason that the V2X message is no longer transmitted through the reserved resource occurs). If the resource reserved to transmit the V2X message is released before the preset time elapses, in a conventional technology, a V2X UE (i.e., a V2X UE other than the V2X UE that has reserved the V2X resource) cannot be aware that the resource reserved to transmit the V2X message has been released. For this reason, a V2X UE according to a conventional technology cannot transmit the V2X message on the resource whose reservation has been released although the reservation of the resource has been released. Accordingly, efficient use of a V2X resource was impossible.

Accordingly, in the present invention, if a V2X terminal, that is, a V2X UE(s), can no longer perform a V2X message transmission operation through its previously reserved (/signaled) periodic (or semistatic) resource because a previously defined event (e.g., a (threshold value or more) speed/progress angle/location change, etc.) has occurred, there are proposed 1. an operation for the V2X terminal to transmit information providing notification that it can no longer perform the V2X message transmission operation to another V2X UE through the previously reserved (/signaled) periodic (or semistatic) resource and 2. an efficient periodic (or semistatic) resource reconfiguration operation and/or a corresponding event-related (fast) V2X message transmission operation.

SUMMARY

An object of the present invention is to provide a V2X operation method performed by a terminal in a wireless communication system and a terminal using the same.

In an aspect, a method for vehicle-to-X (V2X) operation performed by a V2X user equipment (UE) in a wireless communication system is provided. The method may comprise determining whether V2X message transmission is possible on a reserved periodic resource and transmitting a first scheduling assignment (SA) channel comprising information providing notification that the V2X message transmission is not possible on the reserved periodic resource to another V2X UE if the V2X message transmission is not possible on the reserved periodic resource.

The first SA channel may be transmitted without data transmission associated with the first SA channel.

The information providing notification that the V2X message transmission may be not possible on the reserved periodic resource is information providing notification that a periodic resource previously reserved by the V2X UE is released.

The information providing notification that the V2X message transmission may be not possible on the reserved periodic resource is information providing notification that the V2X message transmission is performed through a reconfigured periodic resource.

The V2X message transmission may be determined to be not possible on the reserved periodic resource when a change in a speed of the V2X UE, a change in a progress angle of the V2X UE or a change in a location of the V2X UE is a threshold value or more.

The method may further comprise transmitting a second SA channel comprising information indicative of a new periodic resource in which the V2X message is transmitted.

The second SA channel may be transmitted through an SA channel transmission resource located at a closest point of time after a point of time at which the V2X message transmission is not possible.

The second SA channel may be transmitted through an SA channel transmission resource located at a closest point of time after a preset time offset value is applied to a point of time at which the V2X message transmission is not possible.

The second SA channel may be transmitted plural times.

The first SA channel may be a control channel regarding V2X communication.

A transmission interval of the V2X message may be changed if the V2X message transmission is determined to be not possible on the reserved periodic resource.

A transmission power of the V2X message may be changed if the V2X message transmission is determined to be not possible on the reserved periodic resource.

In another aspect, a user equipment (UE) is provided. The UE may comprise a radio frequency (RF) unit transmitting and receiving radio signals and a processor operatively coupled to the RF unit, the processor may determine whether V2X message transmission is possible on a reserved periodic resource and transmit a first scheduling assignment (SA) channel comprising information providing notification that the V2X message transmission is not possible on the reserved periodic resource to another V2X UE if the V2X message transmission is not possible on the reserved periodic resource.

In accordance with the present invention, there are provided a V2X operation method performed by a terminal in a wireless communication system and a terminal using the same.

In accordance with the present invention, a V2X UE(s) can transmit information providing notification that it can no longer perform a V2X message transmission operation to another V2X UE through its previously reserved (/signaled) periodic (or semistatic) resource when it can no longer perform the V2X message transmission operation through the previously reserved (/signaled) periodic (or semistatic) resource because a previously defined event (e.g., a (threshold value or more) speed/progress angle/location change, etc.) has occurred. Accordingly, radio resource use efficiency can be improved because a different V2X UE can adaptively determine a resource whose reservation has been released and the different V2X UE can transmit a V2X message to be transmitted on the resource whose reservation has been released.

DETAILED DESCRIPTION

Figure 1:
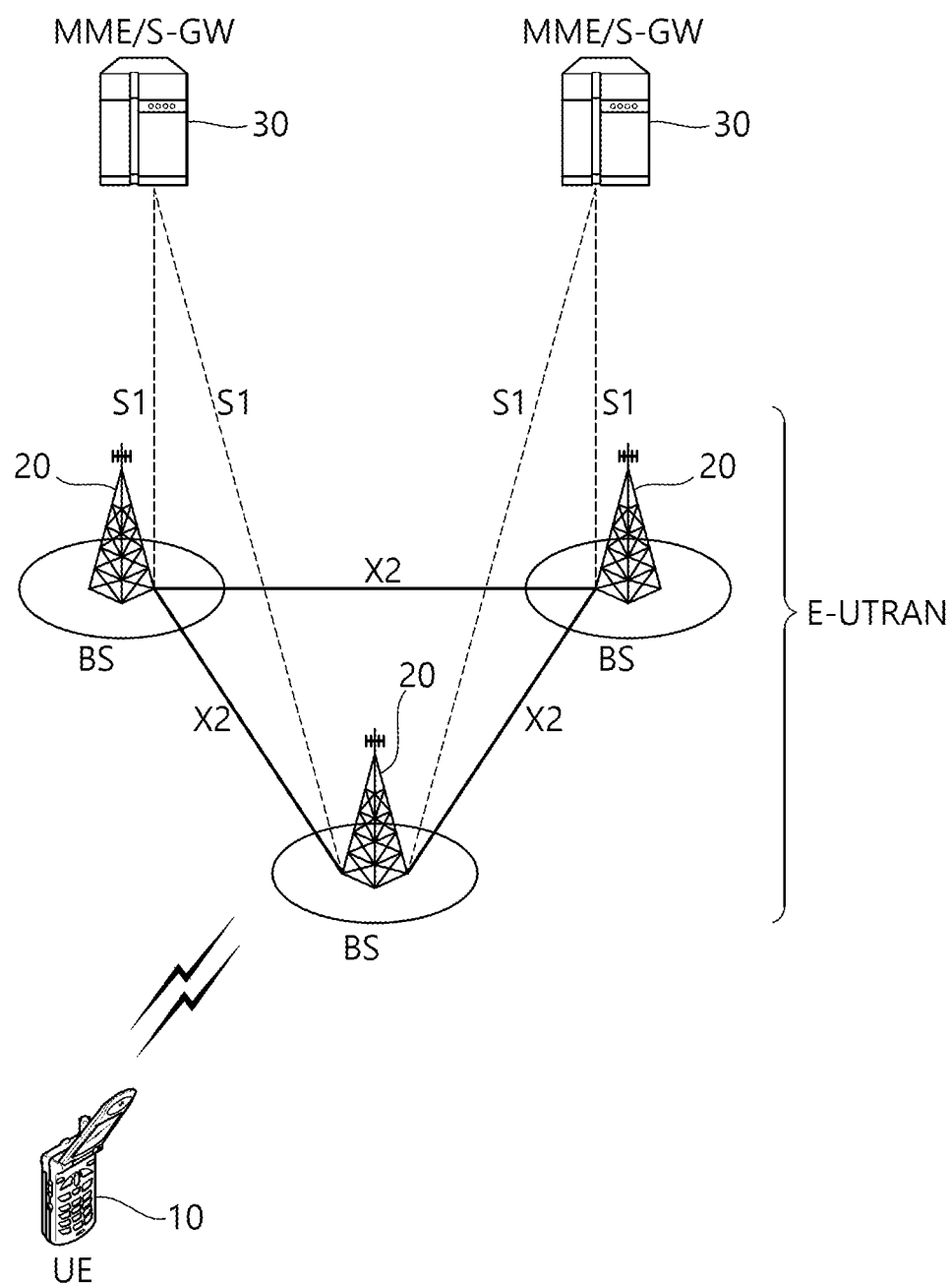
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
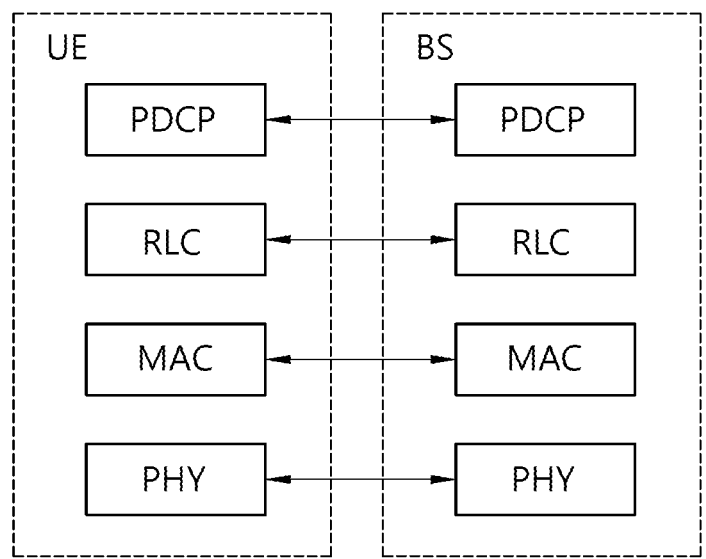
FIG. 2 is a diagram showing a wireless protocol architecture for a user plane.
Figure 3:
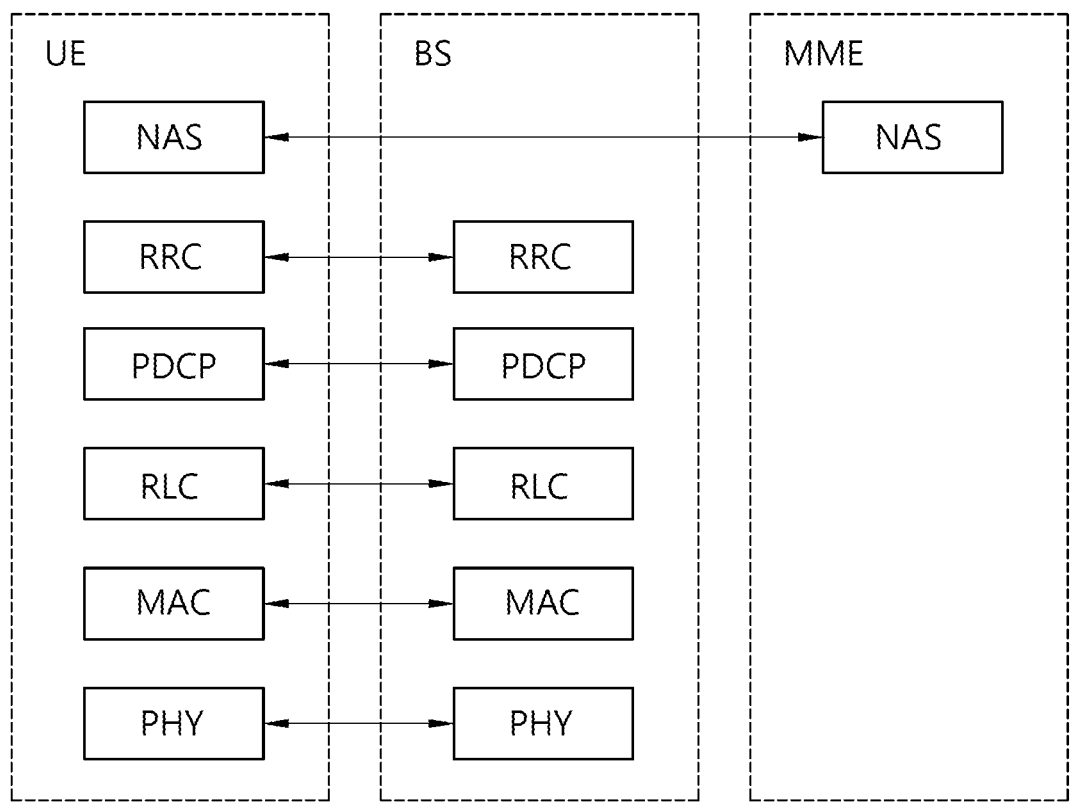
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, a D2D operation will be described. In the 3GPP LTE-A, a service related to the D2D operation refers to Proximity based Services (ProSe). Hereinafter, the ProSe is an equivalent concept with the D2D operation and the ProSe may be compatibly used with the D2D operation. The ProSe is now described.

The ProSe includes ProSe direct communication and ProSe direct discovery. The ProSe direct communication presents communication performed by two or more adjacent terminals. The terminals may perform communication using a protocol of a user plane. A ProSe-enabled UE means a UE for supporting a process related to requirements of the ProSe. Unless otherwise defined, the ProSe-enabled UE includes both of a public safety UE and a non-public safety UE. The public safety UE represents a UE for supporting both of a public safety specified function and the ProSe process. The non-public safety UE is a terminal which supports the ProSe process but does not support the public safety specified function.

The ProSe direct discovery is a process where the ProSe-enabled UE discovers another ProSe-enabled UE. In this case, only ability of the two ProSe-enabled UEs is used. An EPC-level ProSe discovery signifies a process where an EPC determines whether 2 ProSe enable terminals are closed to each other, and reports the close state thereof the two ProSe enabled terminals.

Hereinafter, the ProSe direct communication may refer to D2D communication, and the ProSe direct discovery may refer to D2D discovery.

Figure 4:
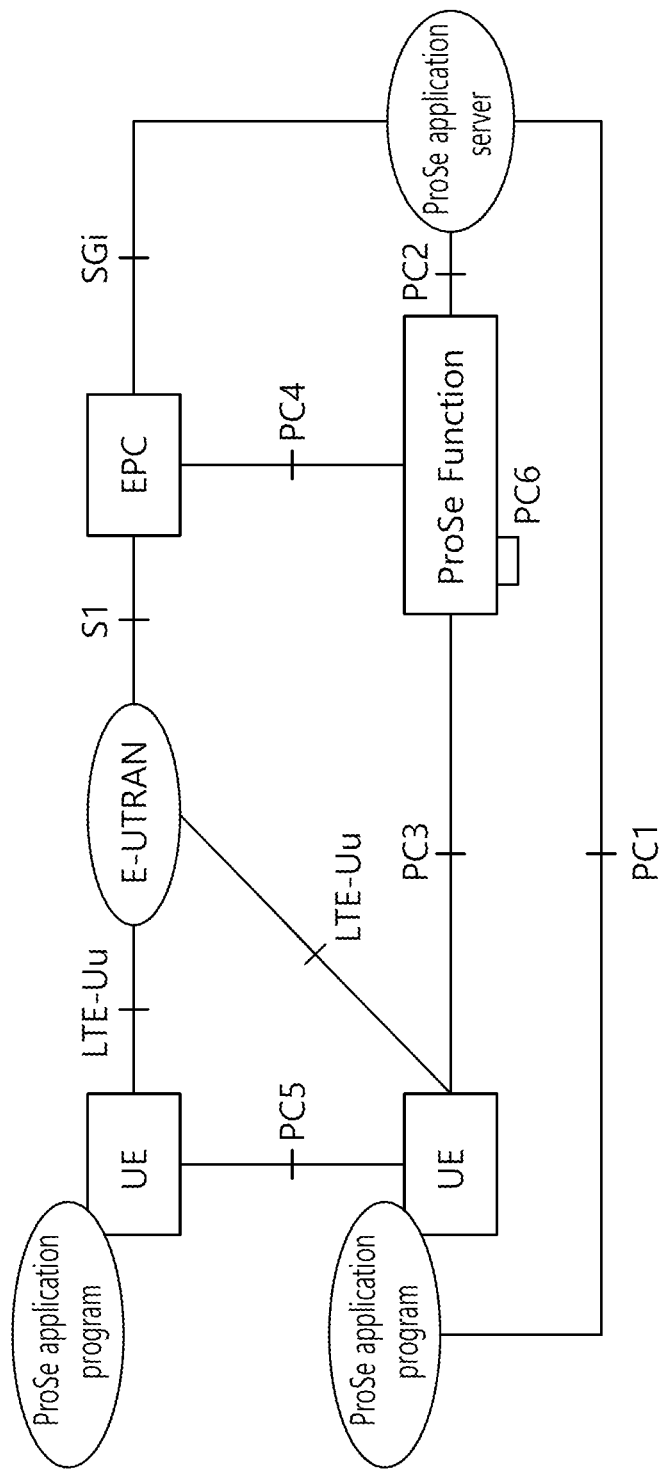
FIG. 4 illustrates a reference structure for a ProSe.

FIG. 4 illustrates a reference structure for a ProSe.

Referring to FIG. 4, the reference structure for a ProSe includes a plurality of terminals having E-UTRAN, EPC, and ProSe application program, a ProSe application (APP) server, and a ProSe function.

An EPC is a representative example of the E-UTRAN. The EPC may include an MME, an S-GW, a P-GW, a policy and charging rules function (PCRF), and a home subscriber server (HSS).

The ProSe application server is a user of ProSe in order to make an application function. The ProSe application server may communicate with an application program in the terminal. The application program in the terminal may use a ProSe ability to make an application function.

The ProSe function may include at least one of following functions but is not limited thereto.

Interworking via a reference point towards the 3rd party applications
Authorization and configuration of the UE for discovery and direct communication)
Enable the function of the EPC level ProSe discovery
ProSe related new subscriber data and handling of data storage, and also handling of ProSe identities
Security related function
Provide control towards the EPC for policy related function Provide function for charging (via or outside of EPC, e.g., offline charging))

Hereinafter, a reference point and a reference interface will be described in a reference structure for the ProSe.

PC1: a reference point between a ProSe application program in the terminal and a ProSe application program in a ProSe application server. The PC1 is used to define signaling requirements in an application level.

PC2: is a reference point between the ProSe application server and a ProSe function. The PC2 is used to define an interaction between the ProSe application server and a ProSe function. An application data update of a ProSe database of the ProSe function may be an example of the interaction.

PC3: is a reference point between the terminal and the ProSe function. The PC3 is used to define an interaction between the terminal and the ProSe function. Configuration for ProSe discovery and communication may be an example of the interaction.

PC4: is a reference point between an EPC and the ProSe function. The PC4 is used to define an interaction between the EPC and the ProSe function. The interaction lay illustrate when a path for 1:1 communication or a ProSe service for real time session management or mobility management are authorized.

PC5: is a reference point to use control/user plane for discovery, communication, and relay between terminals, and 1:1 communication.

PC6: is a reference point to use a function such as ProSe discovery between users included in different PLMNs.

SGi: may be used for application data and application level control information exchange.

<ProSe Direct Communication (D2D Communication)>.

The ProSe direct communication is a communication mode where two public safety terminals may perform direct communication through a PC 5 interface. The communication mode may be supported in both of a case of receiving a service in coverage of E-UTRAN or a case of separating the coverage of E-UTRAN.

Figure 5:
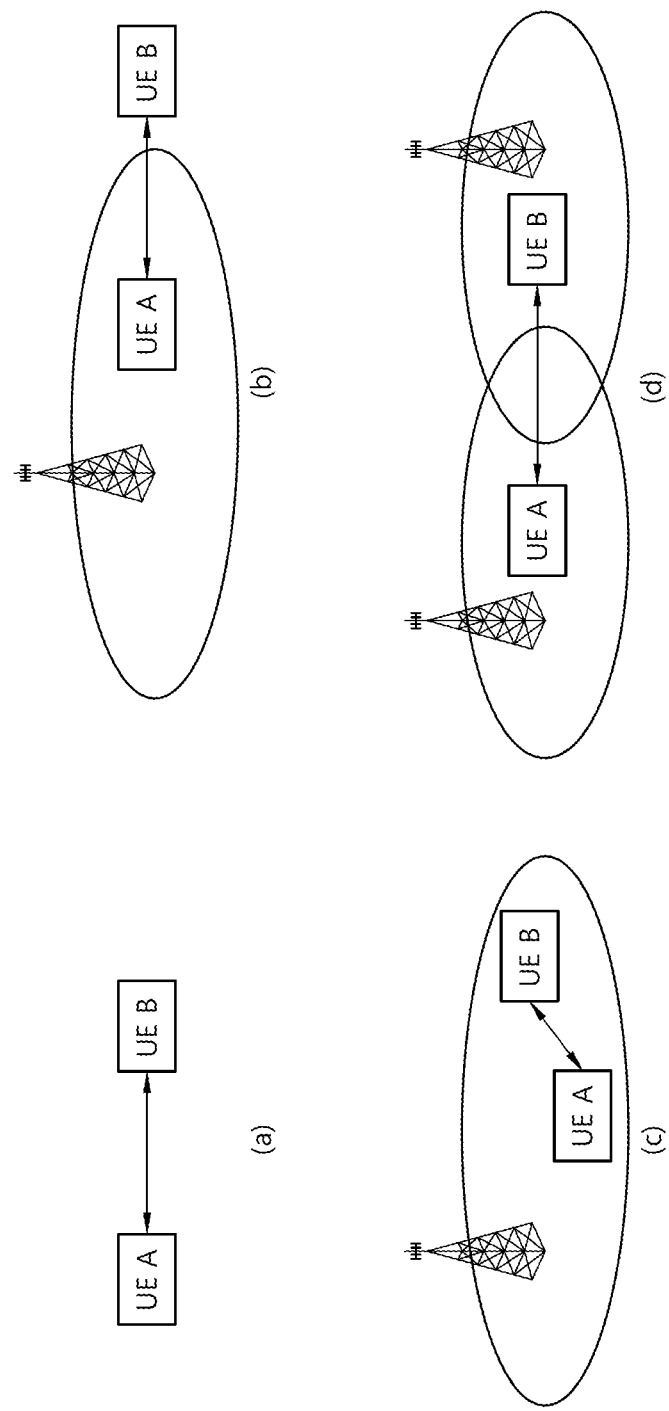
FIG. 5 illustrates arrangement examples of terminals performing ProSe direct communication and cell coverage.

FIG. 5 illustrates arrangement examples of terminals performing ProSe direct communication and cell coverage.

Referring to FIG. 5(*a*), UEs A and B may be located outside of the cell coverage. Referring to FIG. 5(*b*), the UE A may be located in the cell coverage and the UE B may be located outside of the cell coverage. Referring to FIG. 5(*c*), both of UEs A and B may be located in the cell coverage. Referring to FIG. 5(*d*), the UE A may be located in coverage of a first cell and the UE B may be in coverage of a second cell.

As described above, the ProSe direct communication may be performed between terminals which are provided at various positions.

Meanwhile, following IDs may be used in the ProSe direct communication.

Source layer-2 ID: The source layer-2 ID identifies a sender of a packet in a PC 5 interface.

Purpose layer-2 ID: The purpose layer-2 ID identifies a target of a packet in a PC 5 interface.

SA L1 ID: The SA L1 ID represents an in an ID in a scheduling assignment (SA) in the PC 5 interface.

Figure 6:
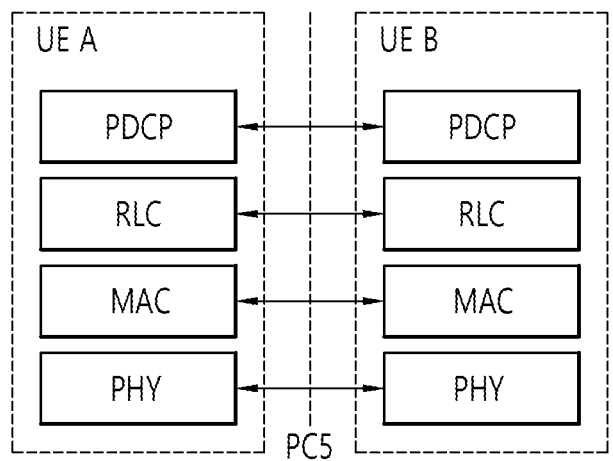
FIG. 6 illustrates a user plane protocol stack for the ProSe direct communication.

FIG. 6 illustrates a user plane protocol stack for the ProSe direct communication.

Referring to FIG. 6, the PC 5 interface includes a PDCH layer, a RLC layer, a MAC layer, and a PHY layer.

There may not be HARQ feedback in the ProSe direct communication. An MAC header may include the source layer-2 ID and the purpose layer-2 ID.

<Radio Resource Assignment for ProSe Direct Communication>.

A ProSe enable terminal may use following two modes with respect to resource assignments for the ProSe direct communication.

1. Mode 1

The mode 2 is a mode for receiving scheduling a resource for the ProSe direct communication from a base station. The terminal should be in a RRC_CONNECTED state according to the mode 1 in order to transmit data. The terminal requests a transmission resource to the base station, and the base station schedules a resource for scheduling assignment and data transmission. The terminal may transmit a scheduling request to the base station and may transmit a Buffer Status Report (ProSe BSR). The base station has data which the terminal will perform the ProSe direct communication and determines whether a resource for transmitting the data is required.

2. Mode 2

The mode 2 is a mode for selecting a direct resource. The terminal directly selects a resource for the ProSe direct communication from a resource pool. The resource pool may be configured by a network or may be previously determined.

Meanwhile, when the terminal includes a serving cell, that is, when the terminal is in an RRC_CONNECTED state with the base station or is located in a specific cell in an RRC_IDLE state, the terminal is regarded to be in coverage of the base station.

If the terminal is located outside of the coverage, only the mode 2 is applicable. If the terminal is located in the coverage, the mode 1 or the mode 2 may be used according to setting of the base station.

If there are no exceptional conditions, only when the base station is configured, the terminal may change a mode from the mode 1 to the mode 2 or from the mode 2 to the mode 1.

<ProSe Direct Discovery (D2D Discovery)>

The ProSe direct discovery represents a process used to discover when the ProSe enabled terminal discovers other neighboring ProSe enabled terminal and refers to D2D direction discovery or D2D discovery. In this case, an E-UTRA wireless signal through the PC 4 interface may be used. Hereinafter, information used for the ProSe direct discovery refers to discovery information.

Figure 7:
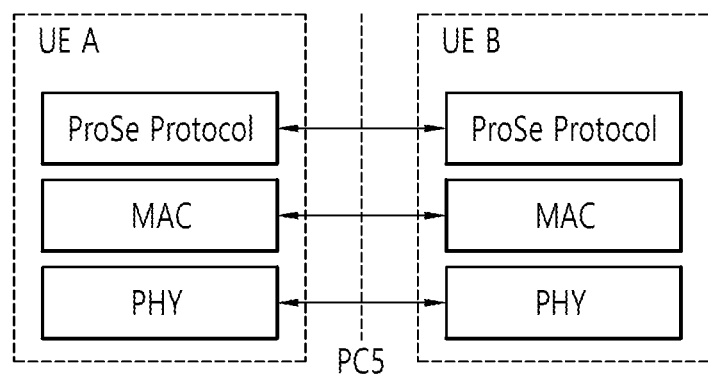
FIG. 7 illustrates a PC 5 interface for D2D discovery.

FIG. 7 illustrates a PC 5 interface for D2D discovery.

Referring to FIG. 7, the PC 5 interface includes an MAC layer, a PHY layer, and a ProSe Protocol layer being an upper layer. Permission for announcement and monitoring of discovery information is handled in the upper layer ProSe Protocol. Contents of discovery information are transparent to an access stratum (AS). The ProSe Protocol allows only valid discovery information to be transferred to the AS for announcement.

An MAC layer receives discovery information from the upper layer ProSe Protocol. An IP layer is not used for transmitting the discovery information. The MAC layer determines a resource used in order to announce the discovery information received from the upper layer. The MAC layer makes and sends a protocol data unit (MAC PDU) to a physical layer. An MAC header is not added.

There are two types of resource assignments for announcing the discovery information.

1. Type 1

The type 1 is a method assigned so that resources for announcing the discovery information are not terminal-specific and the base station provides resource pool configuration for announcing the discovery information to the terminals. The configuration may be included in a system information block (SIB) to be signaled in a broadcast scheme. Alternatively, the configuration may be included in a terminal specific RRC message to be provided. Alternatively, the configuration may be broadcast-signaled or terminal-specific signaled of a different layer from the RRC message.

The terminal selects a resource from an indicated resource pool to announce discovery information using the selected resource. The terminal may announce discovery information through a resource optionally selected during each discovery period.

2. Type 2

The type 2 is a method where resources for announcing the discovery information are terminal-specifically assigned. A terminal in a RRC_CONNECTED state may request a resource for announcing a discovery signal to the base station through a RRC signal. The base station may assign a resource for announcing a discovery signal as an RRC signal. A resource for monitoring the discovery signal in a configured resource pool may be assigned in terminals.

With respect to a terminal in an RRC_IDLE state, a base station may report a type 1 resource pool for announcing the discovery signal as an SIB. Terminals where ProSe direct discovery is allowed use a type 1 resource pool for announcing the discovery information in the RRC_IDLE state. Alternatively, the base station 2) reports that the base station supports the ProSe direct discovery through the SIB but may not provide the resource for announcing the discovery information. In this case, the terminal should enter the RRC_CONNECTED state for announcing the discovery information.

With respect to a terminal in an RRC_CONNECTED state, the base station may configure whether to use a type 1 resource pool or a type 2 resource pool for announcing the discovery information through a RRC signal.

Hereinafter, the present invention is described.

As described above, in general, a D2D operation may have various advantages in that it is signal transmission/reception between close devices. For example, a D2D terminal may perform data communication at a high transfer rate and with low latency. Furthermore, the D2D operation can distribute traffic concentrated on an eNB. If a terminal performing a D2D operation plays the role of a relay, the D2D operation may also function to extend coverage of an eNB. Communication related to a vehicle, including signal transmission/reception between vehicles as the extension of the aforementioned D2D communication, is specially called VEHICLE-TO-X (V2X) communication.

In this case, for example, in V2X (VEHICLE-TO-X), a term "X" means A PEDESTRIAN (COMMUNICATION BETWEEN A VEHICLE AND A DEVICE CARRIED BY AN INDIVIDUAL (example) HANDHELD TERMINAL CARRIED BY A PEDESTRIAN, CYCLIST, DRIVER OR PASSENGER)) (V2P), VEHICLE (COMMUNICATION BETWEEN VEHICLES) (V2V), INFRASTRUCTURE/ NETWORK (COMMUNICATION BETWEEN A VEHICLE AND A ROADSIDE UNIT (RSU)/NETWORK (example) RSU IS A TRANSPORTATION INFRASTRUCTURE ENTITY (example) AN ENTITY TRANSMITTING SPEED NOTIFICATIONS) IMPLEMENTED IN AN eNB OR A STATIONARY UE)) (V2I/N), etc.

Furthermore, for example, for convenience of description of proposed methods, a device (related to V2P communication) carried by a pedestrian (or person) is named a "P-UE", and a device (related to V2X communication) installed on a vehicle is named a "V-UE." Furthermore, in the present invention, for example, a term "entity" may be construed as being a P-UE and/or a V-UE and/or an RSU (/NETWORK/ INFRASTRUCTURE).

A UE providing (or supporting) the aforementioned D2D operation may be named a D2D UE. A UE providing (or supporting) the aforementioned V2X operation may be named a V2X UE. Hereinafter, for convenience of description, embodiments of the present invention are described from the viewpoint of a V2X UE, but the contents of a corresponding V2X UE may also be applied to a D2D UE.

A V2X UE may perform message (or channel) transmission on a previously defined (or signaled) resource pool. In this case, the resource pool may mean a resource(s) previously defined so that the UE performs a V2X operation (or capable of performing the V2X operation). In this case, the resource pool may be defined from the viewpoint of time-frequency, for example.

In V2X communication, a V2X UE transmits a V2X message by taking into consideration a resource reserved by a different V2X UE. In this case, the resource reserved to transmit the V2X message is assumed to be maintained for a preset time, but the resource reserved to transmit the V2X message may be released before the preset time elapses (because a reason that the V2X message can be no longer transmitted through the reserved resource occurs). If the resource reserved to transmit the V2X message is released before the preset time elapses, in a conventional technology, the V2X UE (i.e., a V2X UE other than the V2X UE that has reserved the V2X resource) cannot be aware that the resource reserved to transmit the V2X message has been released. For this reason, efficient use of a V2X resource was impossible because a V2X UE according to a conventional technology cannot transmit the V2X message on the resource whose reservation has been released although the reservation of the resource has been released.

Accordingly, if a V2X terminal, that is, a V2X UE(s), can no longer perform (/maintain) a V2X message transmission operation through its previously reserved (/signaled) periodic (or semistatic) resource because a previously defined event (e.g., a (threshold value or more) speed/progress angle/location change, etc.) has occurred, the present invention proposes an efficient periodic (or semistatic) resource reconfiguration operation and/or a corresponding event-related (fast) V2X message transmission operation (e.g., proposes an operation for the V2X terminal to transmit information providing notification that it can no longer perform (/maintain) the V2X message transmission operation to a different V2X UE through the previously reserved (/signaled) periodic (or semistatic) resource).

In this case, for example, in a V2X UE(s) in which a corresponding event has occurred, an energy sensing threshold value, etc. for (1) the interval between continuous V2X message transmissions (/generations) and/or (2) a V2X message transmission (/generation) period and/or (3) a V2X message size and/or (4) a resource (/pool) location used for V2X message transmission and/or (5) V2X message transmission power and/or (6) transmission resource collision avoidance with a different V2X UE(s) may be changed.

First, an operation for a V2X terminal to transmit information providing notification that it can no longer perform a V2X message transmission operation (e.g., a warning message) to another V2X UE through its previously reserved (/signaled) periodic (or semistatic) resource is described through drawings.

Figure 8:
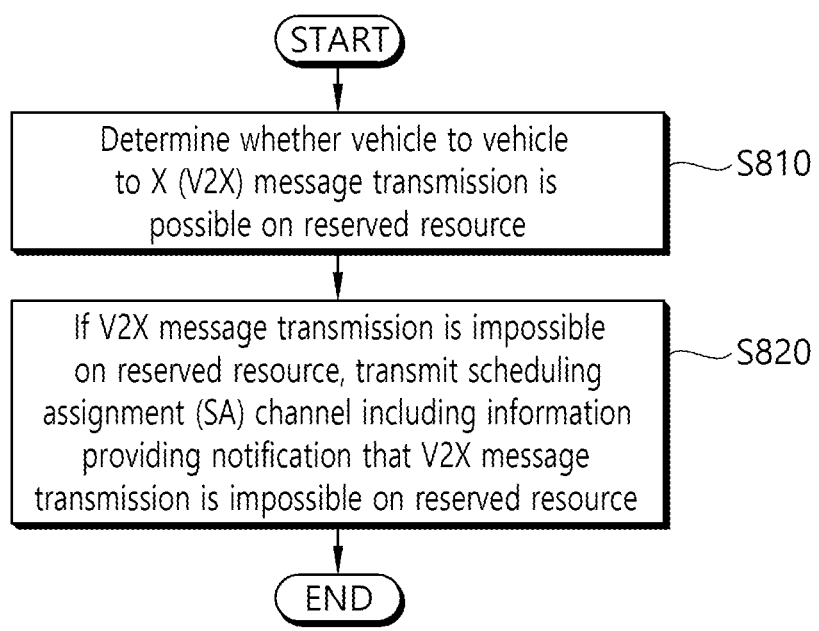
FIG. 8 is a flowchart of a method of transmitting information providing notification that V2X message transmission is impossible on a reserved resource according to an embodiment of the present invention.

FIG. 8 is a flowchart of a method of transmitting information providing notification that V2X message transmission is impossible on a reserved resource according to an embodiment of the present invention.

Referring to FIG. 8, a V2X UE may determine whether vehicle to X (V2X) message transmission is possible on a reserved resource (S810). That is, the V2X UE may determine whether V2X message transmission is possible on a reserved periodic resource. An example in which V2X message transmission is impossible on a reserved resource, as described above, may include that a V2X UE(s) can no longer perform a V2X message transmission operation through its previously reserved (/signaled) periodic (or semistatic) resource because a previously defined event (e.g., a (threshold value or more) speed/progress angle/location change, etc.) has occurred.

If the V2X message transmission is impossible on the reserved resource, the V2X UE may transmit a scheduling assignment (SA) channel including information providing notification that V2X message transmission is impossible on the reserved resource (S820). That is, if the V2X message transmission is not possible on the reserved periodic resource, the V2X UE may transmit a first scheduling assignment (SA) channel, including information providing notification that the V2X message transmission is not possible on the reserved periodic resource, to another V2X UE. In this case, the SA channel may mean a control channel on which resource assignment (for a V2X data channel) and/or a transmission format, etc. can be transmitted. Furthermore, the SA channel including the information providing notification that the V2X message transmission is impossible on the reserved resource may mean a warning message.

More specifically,

[Proposed rule #1] a corresponding V2X UE(s) may be configured to notify a different V2X UE(s) (e.g., a different V2X UE(s) located within a predefined effective (/target) distance) of the following (some) information through previously defined channel transmission. In this case, for example, the channel of corresponding use may be defined as an "SA channel (e.g., SA channel transmission for this purpose may be (additionally) performed even without associated data transmission)" and/or a "DATA channel" and/or a "new channel (for such use)."

(Example #1-1) information (/indicator) indicating that a corresponding V2X UE(s) "releases" a previously reserved (/signaled) periodic (or semistatic) resource (from a specific point of time (SF #N)).

(Example #1-2) information (and/or reconfigured (/changed) periodic (or semistatic) resource (/pool) information) indicating that V2X message transmission will be performed through a different periodic (or semistatic) resource (/pool) reconfigured (/re-signaled) (from a specific point of time (SF #N)).

(Example #1-3) information indicating that the interval between continuous V2X message transmissions (/generations) (from a specific point of time (SF #N)) will be reconfigured (/changed) (and/or interval information between reconfigured (/changed) continuous V2X message transmissions (/generations)).

As an additional example, information indicating that a V2X message transmission (/generation) period will be reconfigured (/changed) (from a specific point of time (SF #N)) (and/or reconfigured (/changed) V2X message transmission (/generation) period information) and/or information indicating that V2X message transmission power will be reconfigured (/changed) (from a specific point of time (SF #N)) (and/or reconfigured (/changed) V2X message transmission power information) and/or information indicating that an energy sensing threshold value for transmission resource collision avoidance with a different V2X UE(s) will be reconfigured (/changed) (from a specific point of time (SF #N)) (and/or reconfigured (/changed) energy sensing threshold value information), etc. may be transmitted to a different V2X UE(s) through the channel (e.g., an "SA channel") transmission of the use.

In the above examples, the "specific point of time (SF #N)" may be defined as the closest point of time at which the reconfiguration of a periodic (or semistatic) resource is possible, including (or not including) a point of time at which a channel (e.g., an "SA channel") providing notification of such information is transmitted and/or at which a corresponding event has occurred subsequently (or the closest point of time at which the reconfiguration of the periodic (or semistatic) resource is possible) after a previously set (/signaled) time offset is applied from a point of time at which a corresponding event has occurred (or a channel transmission point of time providing notification of the information)), and/or the closest periodic (or semistatic) resource point of time previously reserved (/signaled) (including) (or not including) after a point of time at which a corresponding event has occurred (or the closest periodic (or semistatic) resource point of time previously reserved (/signaled) after a previously set (/signaled) time offset is applied from a point of time at which a corresponding event has occurred (or a channel transmission point of time providing notification of the information), and/or a point of time after a previously set (/signaled) time offset is applied from a point of time at which a corresponding event has occurred (or channel transmission point of time providing notification of the information). In this case, for example, the "time offset value" may be a previously set (/signaled) specific value (e.g., 4MS) or may be set as a multiple value of a resource reservation-related period.

The V2X UE may notify a different V2X UE of information providing notification of whether to transmit the V2X message using which resource in addition to the operation of the V2X UE to transmit information providing notification that it can no longer perform the V2X message transmission operation (e.g., warning message) to the different V2X UE through its previously reserved (/signaled) periodic (or semistatic) resource, which is the aforementioned embodiment.

Figure 9:
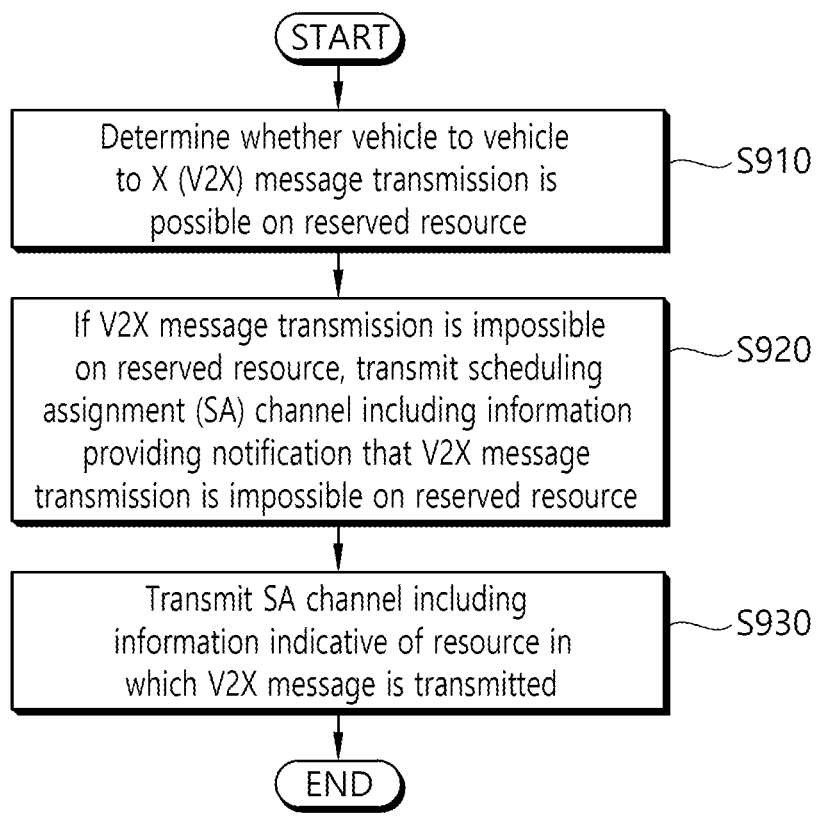
FIG. 9 is a flowchart of a method of transmitting information providing notification that V2X message transmission is impossible on a reserved resource according to another embodiment of the present invention.

FIG. 9 is a flowchart of a method of transmitting information providing notification that V2X message transmission is impossible on a reserved resource according to another embodiment of the present invention.

Referring to FIG. 9, a V2X UE may determine whether vehicle to X (V2X) message transmission is possible on a reserved resource (S910). An example which V2X message transmission is not possible on a reserved resource, as described above, may mean that a V2X UE(s) can no longer perform a V2X message transmission operation through its previously reserved (/signaled) periodic (or semistatic) resource because a previously defined event (e.g., a (threshold value or more) speed/progress angle/location change, etc.) has occurred.

If the V2X message transmission is impossible on the reserved resource, the V2X UE may transmit a scheduling assignment (SA) channel including information providing notification that the V2X message transmission is impossible on the reserved resource (S920). In this case, as described above, the V2X UE may be configured to notify a different V2X UE(s) (e.g., a different V2X UE(s) located in a predefined effective (/target) distance) of the aforementioned information through previously defined channel transmission. In this case, for example, the channel of corresponding use may be defined as an "SA channel (e.g., SA channel transmission for this purpose may be (additionally) performed even without associated data transmission)" and/or a "DATA channel" and/or a "new channel (for such use)". Detailed contents have been described above, and redundant description thereof is omitted hereunder.

Thereafter, the V2X UE may transmit the SA channel including information indicative of a new resource in which the V2X message is transmitted (S930). That is, the V2X UE may transmit a second SA channel including information indicative of a new periodic resource in which the V2X message is transmitted. In this case, for example, a second SA channel and a first SA channel may be defined (/implemented) as the same (single) channel (transmission). More specifically,

[Proposed rule #2] in the [Proposed rule #1], in order to notify a different V2X UE(s) of specific information (e.g., information providing notification that a V2X message transmission operation can be no longer performed through a previously reserved (/signaled) periodic (or semistatic) resource and/or information providing notification that a V2X message is transmitted using which resource in the future), a transmitted channel (e.g., an "SA channel") may be defined to comply with the following transmission timing and transmission number. In this case, the following rules may be limitedly applied to a case where a channel (e.g., "SA channel") transmission-related resource for the use is periodically (or semistatically) reserved. Furthermore, for example, in the following examples, a "time offset value" may be a previously set (/signaled) specific value (e.g., 4MS) or may be set as a multiple value of a resource reservation-related period.

(Example #2-1) a configuration may be performed so that channel transmission is performed through the closest corresponding channel transmission resource (/pool) that has been previously configured (e.g., through an SA resource in the case of SA channel transmission), including (other than) a point of time (SF #K) at which an event has occurred subsequently (or a configuration may be performed so that channel transmission is performed through the closest corresponding channel transmission resource (/pool) that has been previously configured after a previously set (/signaled) time offset is applied from a point of time (SF #K) at which an event has occurred).

(Example #2-2) a configuration may be performed so that channel transmission is performed through a previously configured corresponding channel transmission resource (/pool) at the closest point of time at which the reconfiguration of a periodic (or semistatic) resource is possible including (other than) a point of time (SF #K) at which an event has occurred subsequently (or a configuration may be performed so that channel transmission is performed through a previously configured corresponding channel transmission resource (/pool) at the closest point of time at which the reconfiguration of the periodic (or semistatic) resource is possible after a previously set (/signaled) time offset is applied from a point of time (SF #K) at which an event has occurred).

(Example #2-3) a configuration may be performed so that channel transmission is performed through a previously configured corresponding channel transmission resource (/pool) at the closest periodic (or semistatic) resource point of time that has been previously reserved (/signaled) including (other than) a point of time (SF #K) at which an event has occurred subsequently (or a configuration may be performed so that channel transmission is performed through a previously configured corresponding channel transmission resource (/pool) at the closest periodic (or semistatic) resource point of time that has been previously reserved (/signaled) after a previously set (/signaled) time offset is applied from a point of time (SF #K) at which an event has occurred).

(Example #2-4) the channel (e.g., "SA channel") for the use may be transmitted once or may be transmitted several times (e.g., twice) based on a previously defined (/signaled) value (in order to increase the reception probability of the channel) (or for a V2X UE(s) that may fail in the reception of the corresponding channel due to a half duplex problem).

In this case, for example, if a corresponding channel is transmitted several times, initial transmission is performed according to the aforementioned examples (e.g., (Example #2-1), (Example #2-2), (Example #2-3)). Subsequent transmission(s) may be performed (in a TDM form) through the closest corresponding channel transmission resource (/pool) that has been previously configured after an initial transmission point of time (or may be performed (in a TDM form) through the closest corresponding channel transmission resource (/pool) that has been previously configured after a previously set (/signaled) time offset is applied from the initial transmission point of time), or subsequent transmission(s) may be performed (in a TDM form) through a previously configured corresponding channel transmission resource (/pool) at the closest point of time at which the reconfiguration of a periodic (or semistatic) resource is possible after an initial transmission point of time (or may be performed (in a TDM form) through a previously configured corresponding channel transmission resource (/pool) at the closest point of time at which the reconfiguration of a periodic (or semistatic) resource is possible after a previously set (/signaled) time offset is applied from an initial transmission point of time, or subsequent transmission(s) may be performed (in a TDM form) through a previously configured corresponding channel transmission resource (/pool) at the closest periodic (or semistatic) resource point of time that has been previously reserved (/signaled) after an initial transmission point of time (or may be performed (in a TDM form) through a previously configured corresponding channel transmission resource (/pool) at the closest periodic (or semistatic) resource point of time that has been previously reserved (/signaled) after a previously set (/signaled) time offset is applied from an initial transmission point of time).

As an additional example, if a (periodic (or semistatic)) resource is reselected in the state in which the existing (/previous) reserved (/signaled) resource has not been "released", data is transmitted in the reselected resource, but may additionally notify (a different V2X UE(s)) of information (/fact) indicating that the existing reserved (/signaled) resource has been "released" by transmitting a previously defined channel (e.g., the information may be transmitted without associated data transmission if a channel for such use is defined as an "SA channel").

Although not separately shown in FIG. 9, a method of rapidly (or within a previously defined (/signaled) time) transmitting a corresponding event-related V2X message(s) may be proposed as follows. More specifically,

[Proposed rule #3] In the described situation, when a corresponding event-related V2X message(s) needs to be rapidly (or within a previously defined (/signaled) time) transmitted, definition may be performed so that the following rules are followed.

(Example #3-1) a corresponding event-related V2X message(s) is not transmitted through a previously reserved (/signaled) periodic (or semistatic) resource, but may be performed in an "aperiodic (or dynamic) V2X message transmission form." In this case, for example, the corresponding aperiodic (or dynamic) V2X message transmission may be performed for only previously set (/signaled) time duration and/or may be performed by a previously set (/signaled) number and/or may be performed until the transmission of a channel (e.g., an "SA channel") including pieces of specific information is completed according to the proposed rules (e.g., [Proposed rule #1], [Proposed rule #2]).

In the aforementioned embodiments, the embodiments in a V2X resource reserved by a V2X UE is no longer valid from the viewpoint of the V2X UE that has reserved the V2X resource in order to transmit a V2X message have been described. Hereinafter, a method of determining that a reserved V2X resource has been released even without separate information (e.g., information indicating that a V2X resource is no longer valid) from the viewpoint of another V2X UE (i.e., a UE other than a V2X UE that has reserved the V2X resource) is described through drawings.

Figure 10:
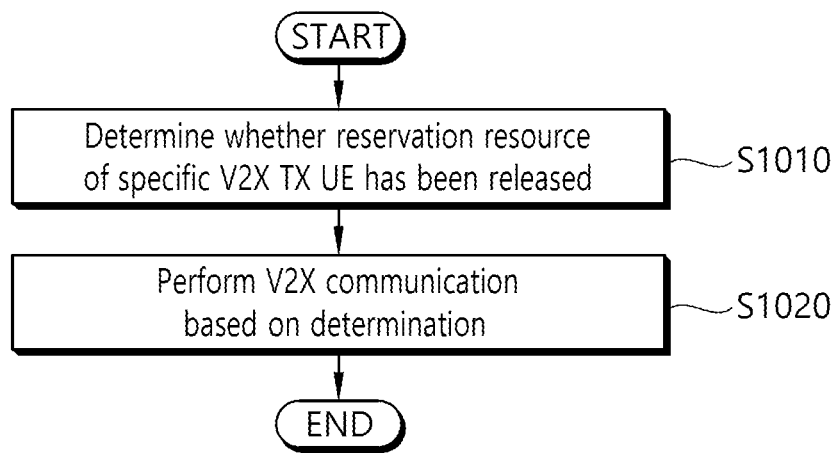
FIG. 10 is a flowchart of a method of determining that a reserved V2X resource has been released according to an embodiment of the present invention.

FIG. 10 is a flowchart of a method of determining that a reserved V2X resource has been released according to an embodiment of the present invention.

Referring to FIG. 10, a V2X UE may determine whether the reservation resource of a specific V2X TX UE has been released (S1010). More specifically,

[Proposed rule #4] (if a channel (e.g., an "SA channel") transmission-related resource including the pieces of specific information is not reserved (periodically (or semistatically)) a V2X RX UE(s) may (implicitly) determine whether a specific V2X TX UE-related previous (/existing) reservation resource has been "released" (or reconfigured) according to the following rules. In this case, for example, the following rules may be limitedly applied to only a case where "SOURCE ID information" and/or "HARQ PROCESS ID information" (and/or "RETRANSMISSION NUMBER (/COUNTING) information" and/or "REDUNDANCY VERSION (RV) information") of the V2X TX UE is included on the channel (or "SA channel") for the use.

(Example #4-1) after a maximum number of periodic (or semistatic) resources (/pools) that may be reserved (/operated) by a specific (one) V2X TX UE is limited to "N" (e.g., 1), if a V2X RX UE(s) has detected (/decoded) that a specific V2X TX UE performs the V2X message transmission on another periodic (or semistatic) resource, but the number of detections (/decodings) has exceeded "N", a (some) periodic (or semistatic) resource previously reserved (/configured) by the corresponding specific V2X TX UE may be defined to be (implicitly) construed (/considered) as being "released."

In this case, the value of the N may have a value of a positive integer. A network may define (or configure) the N with respect to the UE. In this case, the value of the N may be determined based on a message drop probability or a coding rate or a change in the speed of the UE, for example. In accordance with one embodiment, a network may set the value of the N to be small if a speed change of the V2X UE is great and may set the value of the N to be large if a change in the speed is small. Furthermore, in accordance with one embodiment, a network may set a value of the N to be small if the coding rate is high and may set a value of the N to be large if the coding rate is low.

(Example #4-2) after a maximum number of periodic (or semistatic) resources that may be reserved (/operated) as a V2X TX UE-related specific (one) "HARQ PROCESS ID" is limited to "N" (e.g., 1), if a V2X RX UE(s) has detected (/decoded) that the V2X message transmission of the same "HARQ PROCESS ID" related to a specific V2X TX UE is performed on another periodic (or semistatic) resource, but the number of detections (/decodings) has exceeded "N", a previous (some) periodic (or semistatic) resources related to the corresponding "HARQ PROCESS ID" of the (corresponding) specific V2X TX UE may be defined to be (implicitly) construed (/considered) as being "released."

As an additional example, although a V2X RX UE has not received "RELEASE" information transmitted (the existing reserved (/signaled) (periodic (or semistatic)) resource) through a previously defined channel (e.g., an "SA channel") (from a V2X TX UE), if the same V2X TX UE (or the same HARQ PROCESS (ID) of the same V2X TX UE) reserves (/reselects) another resource, the existing reserved (/signaled) resource may be assumed to be "released."

Thereafter, the V2X UE may perform V2X communication based on the determination (S1020). A detailed example in which the UE performs the V2X communication has been described above.

Although not shown through a separate drawing, the V2X UE may perform a resource reconfiguration operation when a specific condition is satisfied. More specifically,

[Proposed rule #5] a V2X (TX) UE(s) may be defined to perform the reconfiguration operation of a periodic (or semistatic) resource when the following condition is satisfied.

(Example #5-1) if a previously defined (/signaled) "LATENCY REQUIREMENT" (e.g., "100MS") is not satisfied (or if transmission is impossible within a previously set (/signaled) threshold time) although an event-related message received in its buffer is transmitted through the closest periodic (or semi static) resource that has been previously reserved (/signaled) (thereafter) by a V2X (TX) UE(s).

It is evident that examples of the aforementioned proposed methods may be considered to be a kind of proposed methods because they may be included in implementation methods of the present invention. Furthermore, the aforementioned proposed methods may be implemented independently, but may be implemented in a combination (or merge) form of some of the proposed methods. For example, in the present invention, the proposed methods have been described based on the 3GPP LTE system, for convenience of description, but the range of a system to which the proposed methods are applied may be extended to other systems in addition to the 3GPP LTE system. For example, the proposed methods of the present invention may be extended for D2D communication. In this case, for example, the D2D communication means that a UE directly communicates with another UE through a radio channel. In this case, for example, the UE means the UE of a user, but may be considered to be a kind of UE if network equipment, such as a base station, transmits/receives a signal according to a communication method between UEs. Furthermore, for example, the proposed methods of the present invention may be limitedly applied to only a MODE 2 V2X operation (and/or MODE 1 V2X operation).

Figure 11:
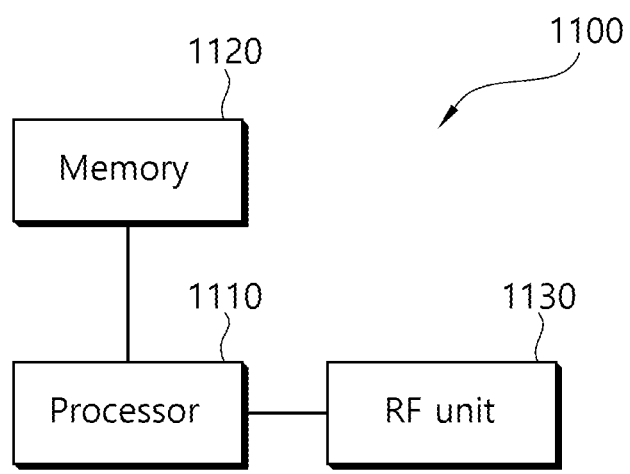
FIG. 11 is a block diagram showing a UE in which an embodiment of the present invention is implemented.

FIG. 11 is a block diagram showing a UE in which an embodiment of the present invention is implemented.

Referring to FIG. 11, the UE 1100 includes a processor 1110, a memory 1120 and a radio frequency (RF) unit 1130.

In accordance with one embodiment, the processor 1110 may determine whether vehicle to X (V2X) message transmission is possible on a reserved resource. If the V2X message transmission is impossible on the reserved resource, the processor 1110 may transmit a scheduling assignment (SA) channel including information providing notification that the V2X message transmission is impossible on the reserved resource. The processor 1110 may transmit an SA channel including information indicative of a resource in which the V2X message is transmitted.

The RF unit 1130 is connected to the processor 1110 and transmits and receives radio signals.

The processor may include application-specific integrated circuits (ASICs), other chipsets, logic circuits and/or data processing devices. The memory may include read-only memory (ROM), random access memory (RAM), flash memory, memory cards, storage media and/or other storage devices. The RF unit may include a baseband circuit for processing a radio signal. When an embodiment is implemented in software, the aforementioned scheme may be implemented as a module (process, function, etc.) for performing the aforementioned function. The module may be stored in the memory and executed by the processor. The memory may be placed inside or outside the processor and connected to the processor using a variety of well-known means.

What is claimed is:

1. A method for transmitting a specific information through a specific channel in a wireless communication system, the method performed by a user equipment (UE) and comprising:
    determining whether a specific event occurs or not; and
    transmitting, to another UE, the specific information notifying that the specific event occurs through the specific channel,
    wherein the specific event includes that a first resource which is a reserved resource for a transmission of data is not available,
    wherein the specific information is transmitted on a second resource,
    wherein the first resource is different from the second resource,
    wherein the second resource is located before the first resource,
    wherein a specific number of resources are located between the first resource and the second resource, and
    wherein the specific number of resources is related to a starting time required for a resource reselection.

2. The method of claim 1, wherein the second resource is located before the first resource by a specific offset.

3. The method of claim 2, wherein the specific offset is determined based on the starting time required for the resource reselection.

4. A user equipment (UE) comprising:
    a transceiver;
    at least one processor; and
    at least one memory operably connected to the at least one processor and storing instructions that, when executed by the at least one processor, perform operations comprising:
    determining whether a specific event occurs or not; and
    controlling the transceiver to transmit, to another UE, a specific information notifying that the specific event occurs through a specific channel,
    wherein the specific event includes that a first resource which is a reserved resource for a transmission of data is not available,
    wherein the specific information is transmitted on a second resource,
    wherein the first resource is different from the second resource,
    wherein the second resource is located before the first resource,
    wherein a specific number of resources are located between the first resource and the second resource, and
    wherein the specific number of resources is related to a starting time required for a resource reselection.

5. The UE of claim 4, wherein the second resource is located before the first resource by a specific offset.

6. The UE of claim 5, wherein the specific offset is determined based on the starting time required for the resource reselection.

* * * * *